US009586286B2

(12) United States Patent
Huang et al.

(10) Patent No.: US 9,586,286 B2
(45) Date of Patent: Mar. 7, 2017

(54) APPARATUS AND METHOD FOR FABRICATING PERIODIC MICRO-PATTERN BY LASER BEAMS

(71) Applicant: LEXTAR ELECTRONICS CORPORATION, Hsinchu (TW)

(72) Inventors: Shih-Hsien Huang, Tainan (TW); Shih-Hao Wang, Tainan (TW); Po-Yuan Huang, Taichung (TW)

(73) Assignee: Lextar Electronics Corporation, Hsinchu (TW)

( * ) Notice: Subject to any disclaimer, the term of this patent is extended or adjusted under 35 U.S.C. 154(b) by 336 days.

(21) Appl. No.: 14/497,256

(22) Filed: Sep. 25, 2014

(65) Prior Publication Data

US 2015/0122786 A1 May 7, 2015

(30) Foreign Application Priority Data

Nov. 7, 2013 (TW) .............................. 102140421 A

(51) Int. Cl.
| | |
|---|---|
| *B23K 26/06* | (2014.01) |
| *B23K 26/36* | (2014.01) |
| *B23K 26/352* | (2014.01) |
| *B23K 26/40* | (2014.01) |
| *H01L 51/56* | (2006.01) |
| *B23K 26/067* | (2006.01) |
| *G02B 27/10* | (2006.01) |
| *G02B 27/30* | (2006.01) |

(Continued)

(52) U.S. Cl.
CPC ........ *B23K 26/0656* (2013.01); *B23K 26/066* (2015.10); *B23K 26/0648* (2013.01); *B23K 26/0676* (2013.01); *B23K 26/362* (2013.01); *B23K 26/352* (2015.10); *B23K 26/40* (2013.01); *G02B 5/3083* (2013.01); *G02B 19/0014* (2013.01); *G02B 19/0047* (2013.01); *G02B 27/1093* (2013.01); *G02B 27/30* (2013.01); *H01L 51/56* (2013.01)

(58) Field of Classification Search
CPC ........ B23K 26/06; B23K 26/35; B23K 26/36; B23K 26/40; H01L 51/56
USPC ............... 219/121.68, 121.69; 264/400, 482; 438/795
See application file for complete search history.

(56) References Cited

U.S. PATENT DOCUMENTS

| | | | |
|---|---|---|---|
| 6,548,820 B1 * | 4/2003 | Mermelstein | ....... G03F 7/70408 250/550 |
| 7,022,183 B2 * | 4/2006 | Takeda | .................... C30B 13/00 117/103 |

(Continued)

*Primary Examiner* — Samuel M Heinrich

(57) ABSTRACT

The invention provides an apparatus for fabricating a periodic micro-pattern by laser beams. The apparatus includes an ultrafast laser light source configured to generate an output laser beam. A diffraction optical element is configured to divide the output laser beam into a plurality of diffractive laser beams. A confocal system is configured to focus the plurality of diffractive laser beams on a focal point, so that the plurality of diffractive laser beams produces an interference light beam with interference phenomena. The interference light beam ablates a surface of an element to fabricate a periodic micro-pattern on the surface of the element. The confocal system includes a first lens, a second lens and a light shielding mask. The plurality of diffractive laser beams passes through the first lens, the light shielding mask and the second lens in sequence.

32 Claims, 13 Drawing Sheets

(51) Int. Cl.
G02B 19/00 (2006.01)
G02B 5/30 (2006.01)

(56) References Cited

U.S. PATENT DOCUMENTS

| | | | |
|---|---|---|---|
| 7,777,154 B2* | 8/2010 | Satoh | G02B 27/26 156/272.8 |
| 8,207,050 B2* | 6/2012 | You | H01L 21/2026 257/E21.134 |
| 8,486,809 B2* | 7/2013 | Tsuji | B82Y 20/00 257/E21.09 |
| 2005/0169343 A1* | 8/2005 | Ostermann | H01S 5/18355 372/98 |

* cited by examiner

APPARATUS AND METHOD FOR FABRICATING PERIODIC MICRO-PATTERN BY LASER BEAMS

CROSS REFERENCE TO RELATED APPLICATIONS

This application claims priority of Taiwan Patent application No. 102140421, filed on Nov. 7, 2013, the entirety of which is incorporated by reference herein.

BACKGROUND OF THE INVENTION

Field of the Invention

The present invention relates to an apparatus and a method for fabricating a periodic micro-pattern by laser beams, and in particular to an apparatus and a method for fabricating a periodic micro-pattern of optical elements by laser beams.

Description of the Related Art

Light emitting diodes (LEDs) have advantages including high efficiency, longer lifetime, improved physical robustness, smaller size, and being environmentally friendly. However, LEDs still have challenges in terms of light-extraction efficiency (LEE). Conventional technology uses a photolithography process to roughen the surface of LEDs to improve light extraction efficiency. The conventional photolithography process, however, has complex steps. Also, patterns for roughening the surface of LEDs are controlled by masks. The precision of the patterns for roughening the surface of LEDs is hard to improve due to the resolution of the masks and the diffraction limit of the light source for the photolithography process.

Thus, an apparatus and a method for fabricating a micro-pattern are desired.

BRIEF SUMMARY OF THE INVENTION

An apparatus and a method for fabricating a periodic micro-pattern by laser beams are provided. An exemplary embodiment of an apparatus for fabricating a periodic micro-pattern by laser beam includes an ultrafast laser light source configured to generate an output laser beam. A diffraction optical element is configured to divide the output laser beam into a plurality of diffractive laser beams. A confocal system is configured to focus the plurality of diffractive laser beams on a focal point, so that the plurality of diffractive laser beams produces an interference light beam with interference phenomena. The interference light beam ablates a surface of an element to fabricate a periodic micro-pattern on the surface of the element. The confocal system comprises a first lens configured for the plurality of diffractive laser beams being incident thereto to produce a plurality of first collimated laser beams. A light shielding mask having a plurality of holes is configured for the plurality of first collimated laser beams being incident thereto to produce a plurality of second collimated laser beams. A second lens is configured to focus the plurality of second collimated laser beams to a focal point of the second lens. The first lens, the second lens and the light shielding mask are arranged along an optical axis of the output laser beam, and the light shielding mask is disposed between the first lens and the second lens so that the plurality of diffractive laser beams passes through the first lens, the light shielding mask and the second lens in sequence.

An exemplary embodiment of a method for fabricating a periodic micro-pattern by laser beam includes generating an output laser beam by an ultrafast laser light source; the output laser beam being incident to a diffraction optical element to be divided into a plurality of diffractive laser beams. The plurality of diffractive laser beams is incident to the confocal system to be focused on a focal point, so that the plurality of diffractive laser beams produces an interference light beam with an interference phenomena. The confocal system includes a first lens configured for the plurality of diffractive laser beams being incident thereto to produce a plurality of first collimated laser beams. A light shielding mask having a plurality of holes is configured for the plurality of first collimated laser beams being incident thereto to produce a plurality of second collimated laser beams. A second lens is configured to focus the plurality of second collimated laser beams to a focal point of the second lens. The first lens, the second lens and the light shielding mask are arranged along an optical axis of the output laser beam, and the light shielding mask is disposed between the first lens and the second lens, so that the plurality of diffractive laser beams passes through the first lens, the light shielding mask and the second lens in sequence. An element is disposed on the focal point of the second lens so that the interference light beam ablates a surface of the element to fabricate a periodic micro-pattern on the surface of the element.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
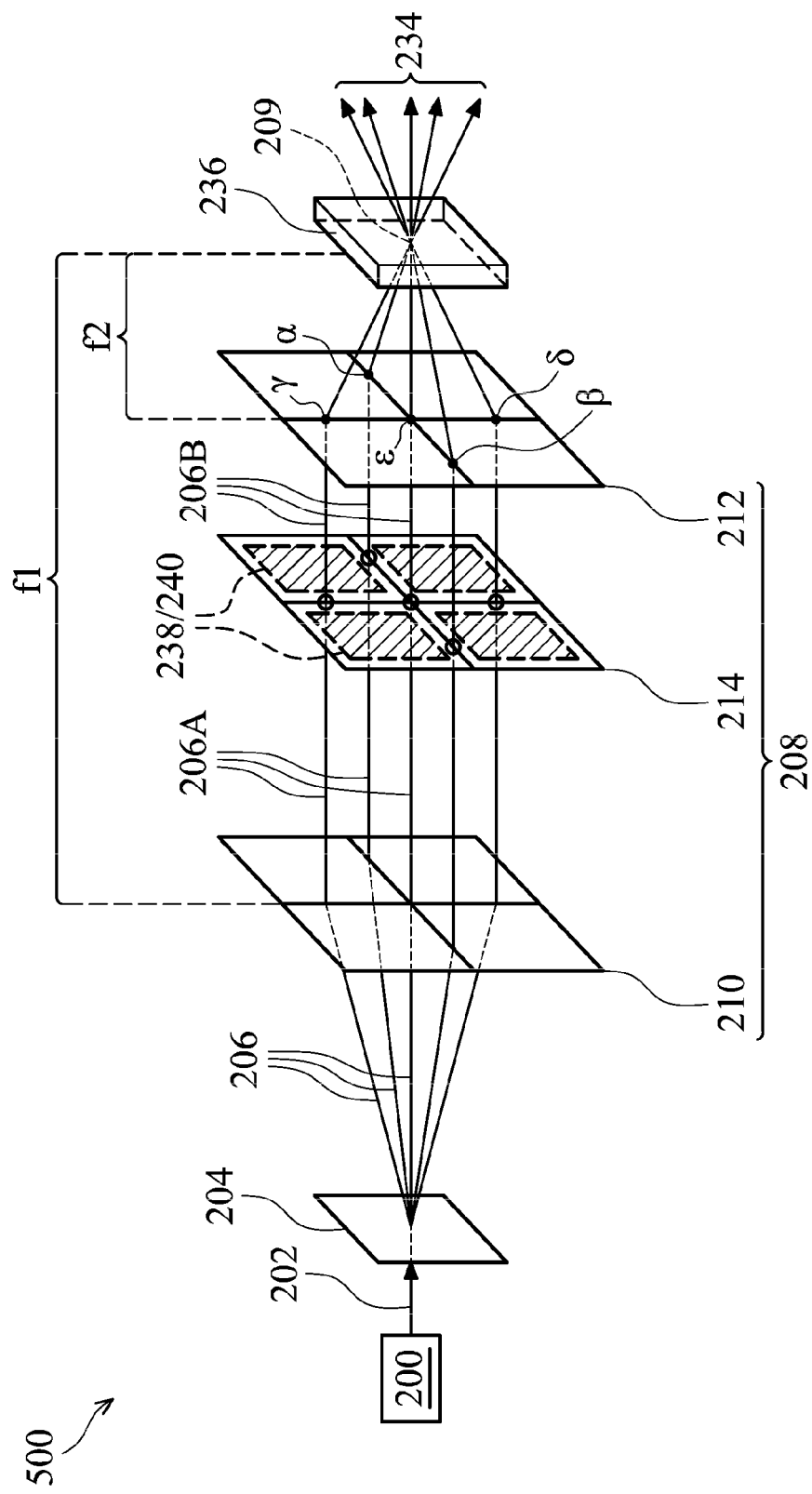
FIG. 1A is a schematic view showing an arrangement of one embodiment of an apparatus for fabricating a periodic micro-pattern by laser beam of the invention.

The following description is of the contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions in the practice of the invention.

FIG. 1A is a schematic view showing an arrangement of one embodiment of an apparatus 500 for fabricating a periodic micro-pattern by laser beam of the invention. In one embodiment, the apparatus 500 is configured to fabricate a periodic micro-pattern on a surface of an element 236, for example, a sapphire substrate. As shown in FIG. 1A, the apparatus 500 includes an ultrafast laser light source 200, a diffraction optical element (DOE) 204 and a confocal system 208. In the description, the ultrafast laser is defined as a laser emitting pulses with durations of less than 10 picoseconds (ps=$10^{-12}$ sec). For example, the ultrafast laser may emit pulses with femtosecond (fs=$10^{-15}$ sec) durations. In one embodiment, the ultrafast laser light source 200 is configured to generate an output laser beam 202. Ultrafast laser light beams may generate ultra-high power density by a focusing method. For example, when an ultrafast laser, such as fs laser, having 100 fs pulse width and 1 mJ (milijoule) pulse is focused on a focal spot with 20 μm diameter, a power density of the fs laser may be achieved to $10^{15}$ W/cm$^2$ degree. The ultrafast laser having such high power density incident to the device may have an electron-phonon interaction to cause a nonlinear optical absorption effect. The nonlinear optical absorption effect would ablate a surface of the element. Therefore, the ultrafast laser light source may be used in ultra-precision machining on outer surfaces and inner portions of any element.

Figure 1B:
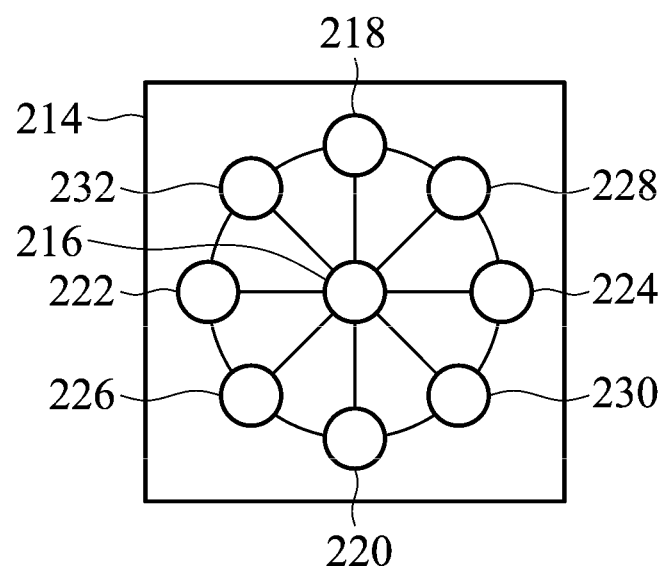
FIG. 1B is a schematic view of a light shielding mask of one embodiment of an apparatus for fabricating a periodic micro-pattern by laser beam of the invention, showing an arrangement of holes of the light shielding mask.

As shown in FIG. 1A. the DOE 204 and the confocal system 208 are arranged along an optical axis of the output laser beam 202. In one embodiment, the DOE 204 may include a diffraction spectroscope. The DOE 204 is configured to divide the output laser beam 202 into a plurality of diffractive laser beams 206, which all have the same intensity and phase. In one embodiment, the confocal system 208 is configured to focus the plurality of diffractive laser beams 206 on a focal point 209 of the confocal system 208, so that the plurality of diffractive laser beams 206 produces an interference light beam 234 with interference phenomena. Due to the wave aspect of light, an intensity of the interference light beam would vary with position over space with a uniform frequency distribution. In one embodiment, the element 236 is appropriately positioned so that the surface of the element 236 can be disposed on the focal point 209 of the confocal system 208. Therefore, the interference light beam 236 may ablate the surface of the element 236 to fabricate a periodic micro-pattern on the surface of the element 236. In one embodiment, the confocal system 208 includes a first lens 210, a light shielding mask 214 and the second lens 212 arranged along a single optical axis (such as an optical axis of the output laser beam 202). Also. The light shielding mask 214 is disposed between the first lens 210 and the second lens 212, so that the plurality of diffractive laser beams 206 passes through the first lens 210, the light shielding mask 214 and the second lens 212 in sequence. As shown in FIG. 1A, the first lens 210 is configured for the plurality of diffractive laser beams 206 being incident thereto to produce a plurality of first collimated laser beams 206A. Also, the light shielding mask 214 having a plurality of holes (such as a first hole 216 to a ninth hole 232 as shown in FIG. 1B), is configured for the plurality of first collimated laser beams 206A being incident thereto to produce a plurality of second collimated laser beams 206B. In one embodiment, a phase difference between the plurality of second collimated laser beams 206B is zero. That is to say, the plurality of second collimated laser beams 206B all have the same phase. Additionally, the second lens 212 is configured to focus the plurality of second collimated laser beams 206B to a focal point of the second lens 212 (i.e. the focal point 209). In one embodiment, the first lens 210 and the second lens 212 are convex lenses.

FIG. 1B is a schematic view of a light shielding mask 214 of one embodiment of the apparatus 500 for fabricating a periodic micro-pattern by laser beam of the invention, showing an arrangement of holes of the light shielding mask 214. In one embodiment, the light shielding mask 214 includes a first hole 216 and a plurality of symmetric holes (such as a second hole 218 to the ninth hole 232 as shown in FIG. 1B). The first hole 216 is arranged along an optical axis of the first lens 210 and the second lens 212. The plurality of symmetric holes is positioned on a circumference of a circle, and the first hole 216 is positioned on a central point of the circle. Therefore, each of the symmetric holes is separated from the first hole 216 by a distance that is the same as a radius of the circle. Further, the plurality of symmetric holes is symmetric to an axis vertically through the first hole 216. As shown in FIG. 1B, in this embodiment, the light shielding mask 214 has nine holes, and the symmetric holes of the light shielding mask 214 include a second hole 218, a third hole 220, a fourth hole 222, a fifth hole 224, a sixth hole 226, a seventh hole 228, an eighth hole 230 and a ninth hole 232. The second hole 218 to the ninth hole 232 are positioned on the circumference of the circle, and the first hole 216 is positioned on the central point of the circle. Also, each of the symmetric holes is separated from the first hole 216 by a distance that is the same as the radius of the circle. Therefore, as shown in FIG. 1B, the second hole 218 and the third hole 220 are disposed symmetric to the axis vertically through the first hole 216. The fourth hole 222 and the fifth hole 224 are disposed symmetric to the first hole 216. The sixth hole 226 and the seventh hole 228 are disposed symmetric to the first hole 216. The eighth hole 230 and the ninth hole 232 are disposed symmetric to the first hole 216. In this embodiment, a central angle whose vertex is the first hole 216 and whose sides are radii intersecting the circle in any two adjacent holes of the second hole 218 to the ninth hole 232 is 45 degrees. Alternatively, the number of symmetric holes is not limited but can be changed according to design requirements. Additionally, in one embodiment, a central angle whose vertex is the first hole and whose sides are radii intersecting the circle in any two adjacent holes of the second to ninth holes may keep the same value.

Electric field formulas of the interference light beam produced by the diffractive laser beams, which have the same phase and respectively pass through the first hole 216 to the ninth hole 232, are described. The diffractive laser beams are divided from the output laser beam by the DOE, and the output laser beam is generated from the ultrafast laser light source. Please refer to FIGS. 1A and 1B. In one embodiment, the electric field formula of the interference light beam only passing through the first hole 216 of the light shielding mask 214 and to be focused on the focal point (i.e. the focal point 209) is $E \cos(kz-\omega t+\phi_H)$, wherein E is an electric field, k is a wave vector, z is a position vector, $\omega$ is an angular velocity, t is time, $\phi_H$ is a phase shift between one and the remaining first collimated laser beams only passing through the first hole. The electric field formula of the interference light beam only passing through the second hole 218 of the light shielding mask 214 and to be focused on the focal point (i.e. the focal point 209) is $E \cos(k \cos\theta_z z-k \sin\theta_y y-\omega t+\phi_A)$, wherein E is an electric field, k is a wave vector, y and z are position vectors, $\omega$ is an angular velocity, t is time, $\theta z$ and $\theta y$ are incident angles of the interference light beam incident to the surface of the element 236, $\phi_A$ is a phase shift between one and the remaining first collimated laser beams only passing through the second hole. The electric field formula of the interference light beam only passing through the third hole 220 of the light shielding mask 214 and to be focused on the focal point (i.e. the focal point 209) is $E \cos(k \cos\theta_z z+k \sin\theta_y y-\omega t+\theta_B)$, wherein E is an electric field, k is a wave vector, y and z are position vectors, $\omega$ is an angular velocity, t is time, $\theta z$ and $\theta y$ are incident angles of the interference light beam incident to the surface of the element 236, $\phi_B$ is a phase shift between one and the remaining first collimated laser beams only passing through the third hole. The electric field formula of the interference light beam only passing through the fourth hole 222 of the light shielding mask 214 and to be focused on the focal point (i.e. the focal point 209) is $E \cos(k \cos\theta_z z-k \sin\theta_x x-\omega t+\phi_c)$, wherein E is an electric field, k is a wave vector, x and z are position vectors, $\omega$ is an angular velocity, t is time, $\theta z$ and $\theta x$ are incident angles of the interference light beam incident to the surface of the element 236, $\phi_C$ is a phase shift between one and the remaining first collimated laser beams only passing through the fourth hole. The electric field formula of the interference light beam only passing through the fifth hole 224 of the light shielding mask 214 and to be focused on the focal point (i.e. the focal point 209) is $E \cos(k \cos\theta_z z+k \sin\theta_x x-\omega t+\phi_D)$, wherein E is an electric field, k is a wave vector, x and z are position vectors, $\omega$ is an angular velocity, t is time, $\theta z$ and $\theta x$ are incident angles of the interference light beam incident to the surface of the element 236, $\theta_D$ is a phase shift between one and the remaining first collimated laser beams only passing through the fifth hole. The electric field formula of the interference light beam only passing through the sixth hole 226 of the light shielding mask 214 and to be focused on the focal point (i.e. the focal point 209) is $E \cos(k \cos\theta_z z-k \sin\theta_{x1} x-k \sin\theta_{y1} y-\omega t+\theta_E)$, wherein E is an electric field, k is a wave vector, x, y and z are position vectors, co is an angular velocity, t is time, $\theta z$ and $\theta x1$ and $\theta y1$ are incident angles of the interference light beam incident to the surface of the element 236, $\phi_E$ is a phase shift between one and the remaining first collimated laser beams only passing through the sixth hole. The electric field formula of the interference light beam only passing through the seventh hole 228 of the light shielding mask 214 and to be focused on the focal point (i.e. the focal point 209) is $E \cos(k \cos\theta_z z+k \sin\theta_{x1} x+k \sin\theta_{y1} y-\omega t+\omega_F)$, wherein E is an electric field, k is a wave vector, x, y and z are position vectors, $\omega$ is an angular velocity, t is time, $\theta z$ and $\theta x1$ and $\theta y1$ are incident angles of the interference light beam incident to the surface of the element 236, $\phi_F$ is a phase shift between one and the remaining first collimated laser beams only passing through the seventh hole. The electric field formula of the interference light beam only passing through the eighth hole 230 of the light shielding mask 214 and to be focused on the focal point (i.e. the focal point 209) is $E \cos(k \cos\theta_z z+k \sin\theta_{x1} x-k \sin\theta_{y1} y-\omega t+\phi_G)$, wherein E is an electric field, k is a wave vector, x, y and z are position vectors, co is an angular velocity, t is time, $\theta z$ and $\theta x1$ and $\theta y1$ are incident angles of the interference light beam incident to the surface of the element 236, $\phi_G$ is a phase shift between one and the remaining first collimated laser beams only passing through the eighth hole. The electric field formula of the interference light beam only passing through the ninth hole 232 of the light shielding mask 214 and to be focused on the focal point (i.e. the focal point 209) is $E \cos(k \cos\theta_z z-k \sin\theta_{x1} x+k \sin\theta_{y1} y-\omega t+\theta_H)$, wherein E is an electric field, k is a wave vector, x, y and z are position vectors, co is an angular velocity, t is time, $\theta z$ and $\theta x1$ and $\theta y1$ are incident angles of the interference light beam incident to the surface of the element 236, $\phi_H$ is a phase shift between one and the remaining first collimated laser beams only passing through the ninth hole. The position vectors of x, y and z shown in the electric field formulas are vertical to each other, wherein the position vectors of x and y are parallel to the surface of the element 236, and the position vector of z is perpendicular to the surface of the element 236. The interference light beam can be produced by choosing the second collimated laser beams passing through the designated holes of the light shielding mask 214 to precisely fabricate various periodic micro-patterns on the surface of the element by using the electric field formulas of the interference light beam passing through from the first hole 216 to the ninth hole 232 of the light shielding mask 214.

Then the mechanism of how the interference light beam 234 ablates a surface of an element to fabricate a periodic micro-pattern on the surface of the element is described using FIGS. 1A and 1B. A ratio of the intensity of the constructive interference light beam (i.e. the maximum of the intensity of the interference light beam), which is produced by focusing the diffractive laser beams having the same phase on the focal point of the confocal system, to each of the diffractive laser beams is square of the number of diffractive laser beams. The diffractive laser beams are divided from the output laser beam by the DOE, and the output laser beam is generated from the single ultrafast laser light source. For example, as shown in FIG. 1A, if the output laser beam 202 generated from the single ultrafast laser light source 202 is divided into four diffractive laser beams all having the same phase and the same intensity $I_0$. The intensity of the constructive interference light beam (i.e. the maximum of the intensity of the interference light beam) is produced by focusing the four diffractive laser beams by the confocal system is $16I_0$. Also, the intensity of the constructive interference light beam produced by focusing different numbers of divided diffractive laser beams by the confocal system can be done in the same manner. The more the intensity of the interference light beam can be improved, the faster the etching velocity can be increased. Additionally, if the surface of the element 236 is exposed to the interference light beam for a longer time, then the interference light beam 234 will ablate the surface of the element 236 with a deeper etching depth. Further, the intensity distribution of the interference light beam over space is known from the electric field formulas of the interference light beam produced by the diffractive laser beams, which have the same phase, respectively passing through the first hole 216 to the ninth hole 232. The diffractive laser beams are divided from the output laser beam by the DOE, and the output laser beam is generated from the ultrafast laser light source. Therefore, a shape, a diameter, and a period of the periodic micro-pattern fabricating can be precisely predetermined by combining various numbers of interference light beams. Accordingly, one embodiment of the apparatus for fabricating a periodic micro-pattern by laser beam can directly ablate the surface of the element 236 to precisely fabricate a periodic micro-pattern on the surface of the element 236 without any exposure and development steps. The ultrafast laser light source can generate ultrafast laser light beams having a high power density. Also, the interference method is a way to accumulate the energy of multiple ultrafast laser light beams, which have the high power density, on a focal point. Therefore, the interference of multiple ultrafast laser light beams can be used to improve the velocity of an ablation process for the fabrication of a periodic micro-pattern.

Figure 2A:
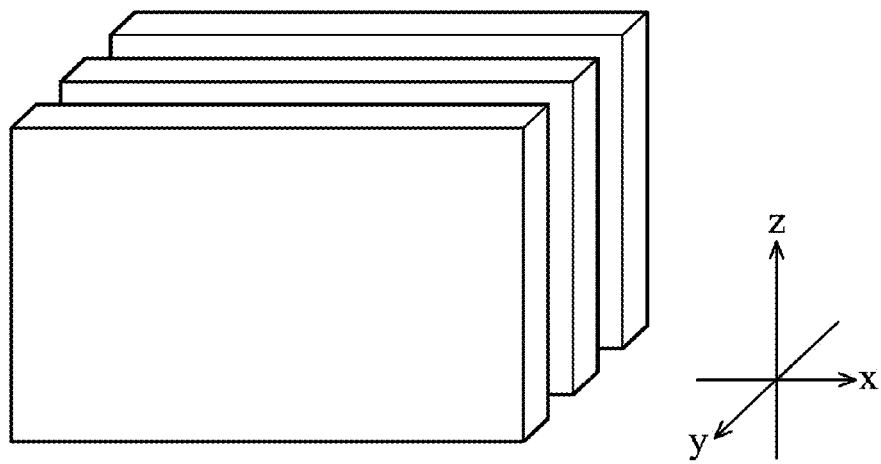
FIGS. 2A, 2B and 2C are two-dimensional (2D) and three-dimensional (3D) simulation results of an interference light beam produced by the diffractive laser beams passing through two of the holes of the light shielding mask of one embodiment of an apparatus for fabricating a periodic micro-pattern by laser beam of the invention.
Figure 2B:
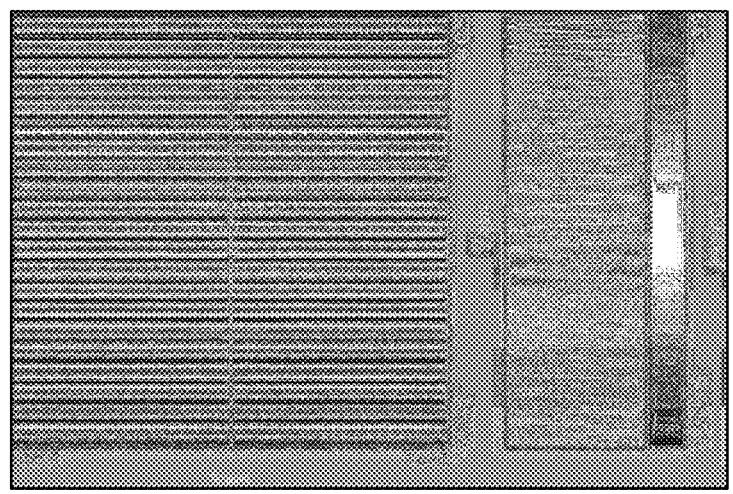
Figure 2C:
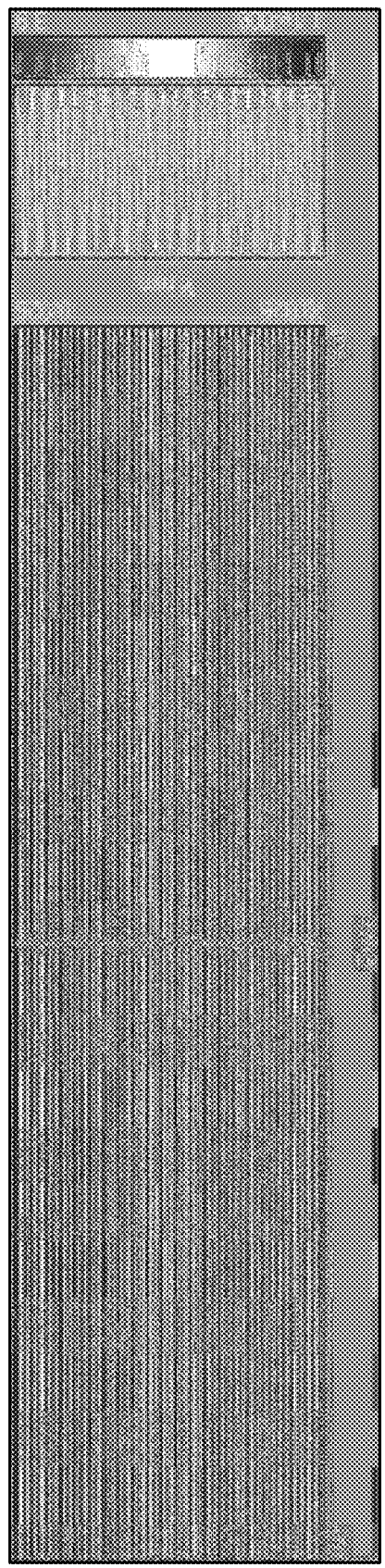

FIGS. 2A, 2B, 2C to 8 are simulation results illustrating distributions of periodic micro-patterns fabricated on the surface of the element. The periodic micro-patterns are ablated by the interference light beam, which is produced by the diffractive laser beams passing through various holes of the light shielding mask 214. The periodic micro-patterns shown in FIGS. 2A, 2B, 2C to 8 are simulated by the Advanced Systems Analysis Program (ASAP) software. In one embodiment, a light blocking element 238 may be disposed on the light shielding mask 214. The light blocking element 238 is configured to block at least one of the first hole 216 to the ninth hole 232 to control the number and incident angle of the diffractive laser beams, which produce the interference light beam. Therefore, the desired periodic micro-patterns fabricated on the surface of the element 236 are fabricated by using the light blocking element 238. FIGS. 2A, 2B and 2C are two-dimensional (2D) (x-y plane and y-z plane) and three-dimensional (3D) simulation results of an interference light beam produced by the diffractive laser beams passing through two of the holes of the light shielding mask 214 of one embodiment of the apparatus 500 for fabricating a periodic micro-pattern by laser beam of the invention. The 2D and 3D simulation results shown in FIGS. 2A, 2B and 2C can be corresponding to the periodic micro-patterns fabricated on the surface of the element 236 in 2D and 3D views. In FIGS. 2A, 2B and 2C, the x-axis and y-axis are parallel to the surface of the element 236, and the z-axis is perpendicular to the surface of the element 236. As shown in FIGS. 1A, 1B, 2A, 2B and 2C, in one embodiment, the first collimated laser beams 206A are designed to pass through only two of the symmetric holes of the light shielding mask 214, to produce two second collimated laser beams 206B with the same phase. For example, a composition of only two of the symmetric holes of the light shielding mask 214 includes the second hole 218 and the third hole 220, or the fourth hole 222 and the fifth hole 224, or the sixth hole 226 and the seventh hole 228, or the eighth hole 230 and the ninth hole 232. FIG. 2A is a 3D simulation result of the interference light beam produced by the diffractive laser beams passing through two of the holes of the light shielding mask 214. From FIG. 2A, the 3D simulation result of the interference light beam produced by the two second collimated laser beams 206B emitted from the two symmetric holes of the light shielding mask 214 shows a plurality of strip-shaped patterns arranged periodically and parallel with each other. Also, a long axis direction of the strip-shaped patterns is substantially parallel to the x-axis. From FIGS. 2B and 2C, simulation results in the x-y plane and y-z plane (2D simulation) of the interference light beam produced by the two second collimated laser beams 206B emitted from the two of the symmetric holes of the light shielding mask 214 show a plurality of strip-shaped patterns arranged parallel with each other.

Figure 3A:
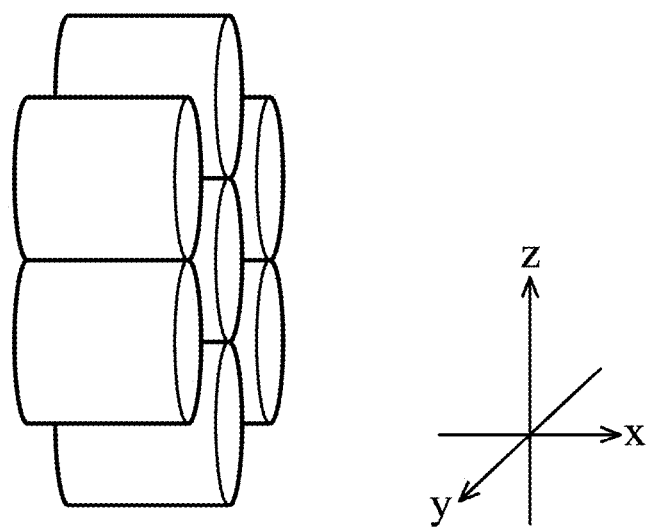
FIGS. 3A, 3B and 3C are two-dimensional (2D) and three-dimensional (3D) simulation results of an interference light beam pattern produced by the diffractive laser beams passing through three of the holes of the light shielding mask of one embodiment of an apparatus for fabricating a periodic micro-pattern by laser beam of the invention.
Figure 3B:
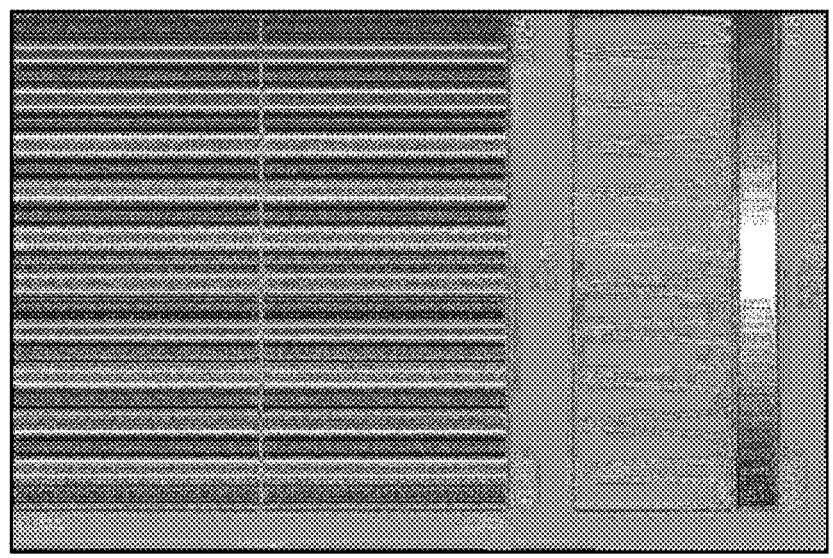
Figure 3C:
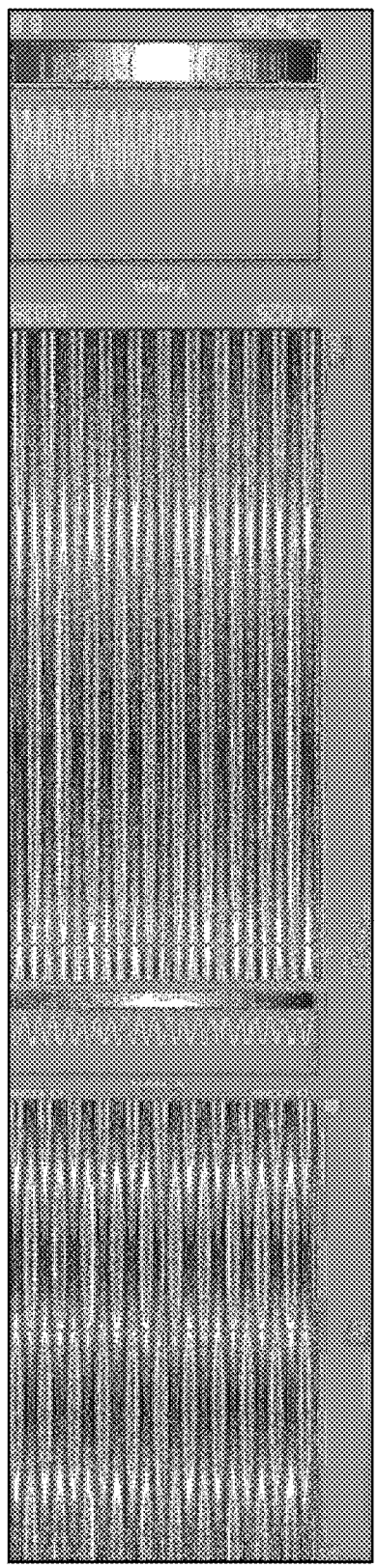

FIGS. 3A, 3B and 3C are two-dimensional (2D) (x-y plane and y-z plane) and three-dimensional (3D) simulation results of an interference light beam produced by the diffractive laser beams passing through three of the holes of the light shielding mask 214 of one embodiment of the apparatus 500 for fabricating a periodic micro-pattern by laser beam of the invention. Similar to FIGS. 2A, 2B and 2C, the x-axis and y-axis are parallel to the surface of the element 236, and the z-axis is perpendicular to the surface of the element 236 as shown in FIGS. 3A, 3B and 3C. As shown in FIGS. 1A, 1B, 3A, 3B and 3C, in one embodiment, the first collimated laser beams 206A are designed to pass through only three of the holes of the light shielding mask 214, to produce three second collimated laser beams 206B with the same phase. For example, a composition of only three of the holes of the light shielding mask 214 includes the first hole 216, the second hole 218 and the third hole 220, or the first hole 216, the fourth hole 222 and the fifth hole 224, or the first hole 216, the sixth hole 226 and the seventh hole 228, or the first hole 216, the eighth hole 230 and the ninth hole 232. FIG. 3A is a 3D simulation result of the interference light beam produced by the diffractive laser beams passing through three of the holes of the light shielding mask 214. From FIG. 3A, the 3D simulation result of the interference light beam produced by the three second collimated laser beams 206B emitted from the three of the symmetric holes of the light shielding mask 214 shows a unit pattern composed of seven cylindrical patterns. Therefore, the periodic micro-pattern in the 3D view is composed by repeating and periodically arranging the unit pattern. Also, a long axis direction of the unit pattern composed of the seven cylindrical patterns is substantially parallel to the x-axis. FIGS. 3B and 3C show simulation results in the x-y plane and y-z plane (2D simulation) of the interference light beam produced by the three second collimated laser beams 206B emitted from the three of the symmetric holes of the light shielding mask 214.

Figure 4A:
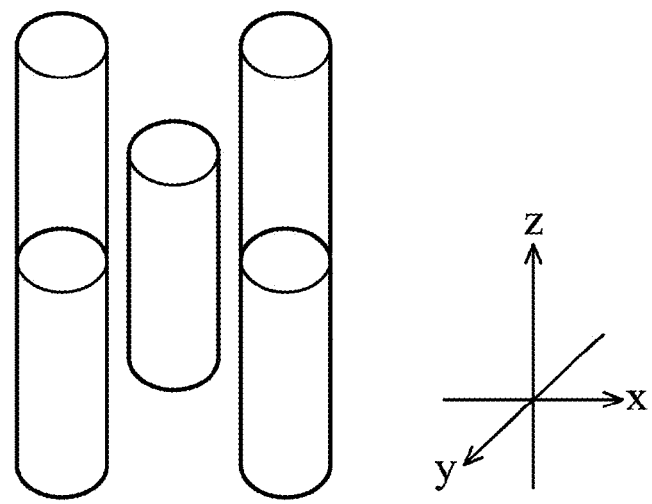
FIGS. 4A, 4B and 4C are two-dimensional (2D) and three-dimensional (3D) simulation results of an interference light beam pattern produced by the diffractive laser beams passing four of the holes of the light shielding mask of one embodiment of an apparatus for fabricating a periodic micro-pattern by laser beam of the invention.
Figure 4B:
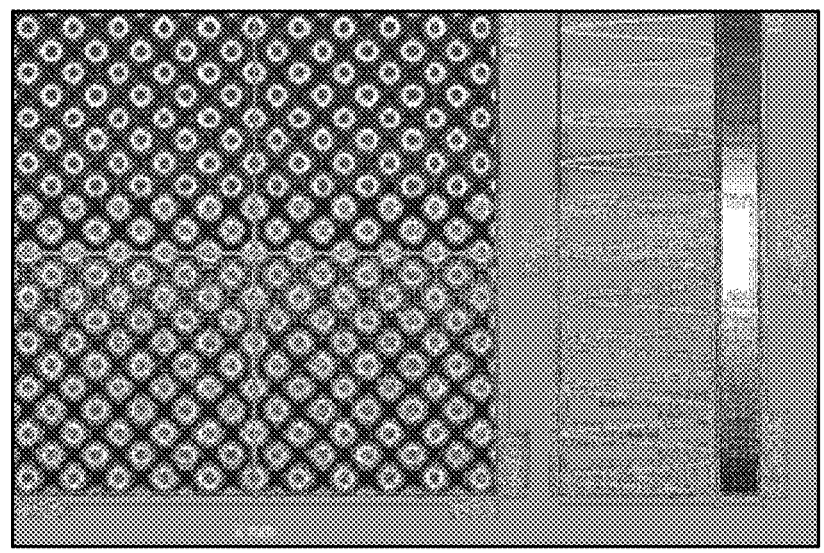
Figure 4C:
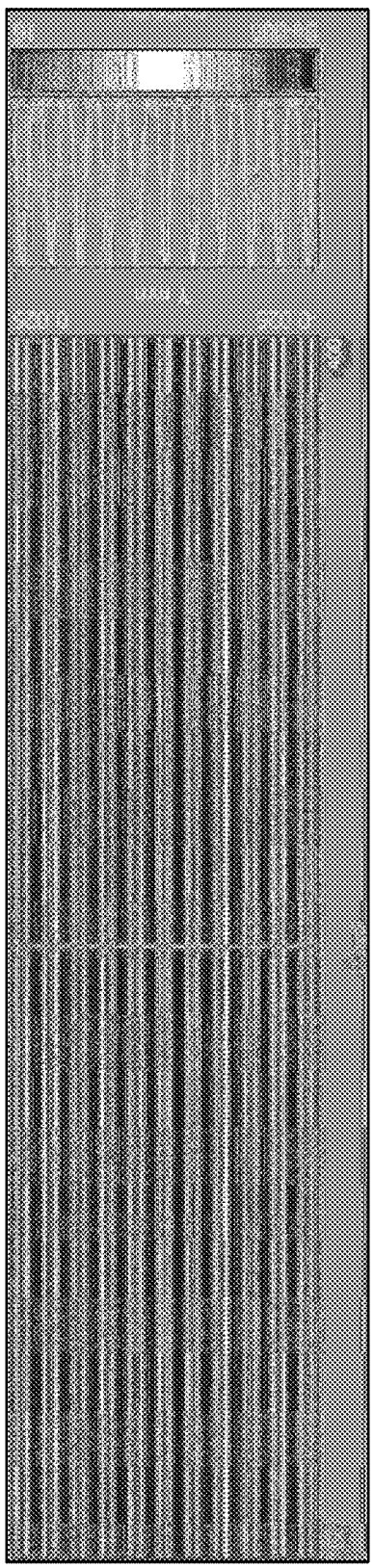

FIGS. 4A, 4B and 4C are two-dimensional (2D) (x-y plane and y-z plane) and three-dimensional (3D) simulation results of an interference light beam produced by the diffractive laser beams passing through four of the light shielding mask 214 of one embodiment of the apparatus 500 for fabricating a periodic micro-pattern by laser beam of the invention. Similar to FIGS. 2A, 2B and 2C, the x-axis and y-axis are parallel to the surface of the element 236, and the z-axis is perpendicular to the surface of the element 236 as shown in FIGS. 4A, 4B and 4C. As shown in FIGS. 1A, 1B, 4A, 4B and 4C, in one embodiment, the first collimated laser beams 206A are designed to pass through only four of the symmetric holes of the light shielding mask 214, to produce four second collimated laser beams 206B with the same phase. For example, a composition of only four of the symmetric holes of the light shielding mask 214 includes the second hole 218, the third hole 220, the fourth hole 222 and the fifth hole 224 or the sixth hole 226, the seventh hole 228, the eighth hole 230 and the ninth hole 232. FIG. 4A is a 3D simulation result of the interference light beam produced by the diffractive laser beams passing through four of the holes of the light shielding mask 214. From FIG. 4A, the 3D simulation result of the interference light beam produced by the four second collimated laser beams 206B emitted from the four of the symmetric holes of the light shielding mask 214 shows a unit pattern composed of five cylindrical patterns. Therefore, the periodic micro-pattern in the 3D view is composed by repeating and periodically arranging the unit pattern. Also, the long axis direction of the unit pattern composed of the five cylindrical patterns is substantially parallel to the z-axis. FIGS. 4B and 4C show simulation results in the x-y plane and y-z plane (2D simulation) of the interference light beam produced by the four second collimated laser beams 206B emitted from the four of the symmetric holes of the light shielding mask 214.

Figure 5A:
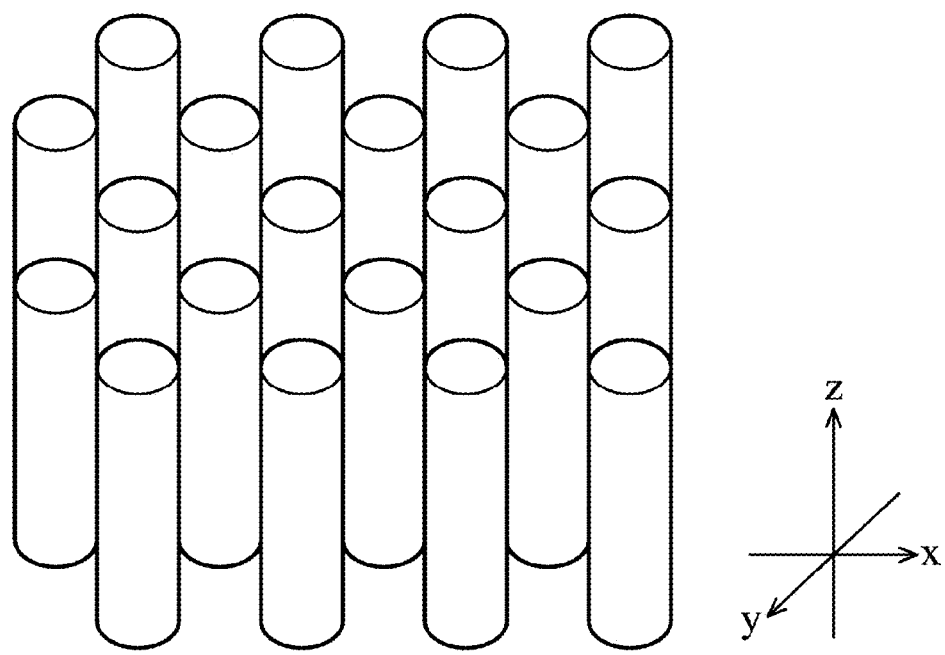
FIGS. 5A, 5B are two-dimensional (2D) and three-dimensional (3D) simulation results of an interference light beam pattern produced by the diffractive laser beams passing through four of the holes of the light shielding mask of one embodiment of an apparatus for fabricating a periodic micro-pattern by laser beam of the invention, wherein a phase shift between the two and the remaining two of the diffractive laser beams is $\lambda/2$.
Figure 5B:
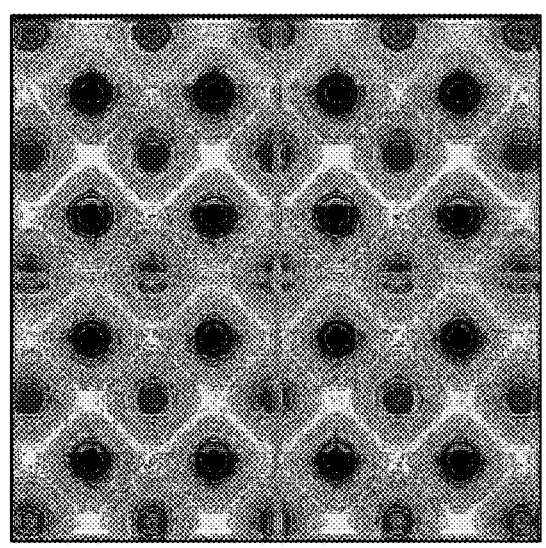

In other embodiments, a phase shift element 240 can be disposed in the confocal system 208 so that a phase of at least one of the plurality of diffractive laser beams 206 passes through the phase shift element 240 is different from a phase of the rest of the plurality of diffractive laser beams 206 without passing through the phase shift element 240 as shown in FIG. 1A. FIGS. 5A, 5B are two-dimensional (2D) and three-dimensional (3D) simulation results of an interference light beam pattern produced by the diffractive laser beams passing through four of the holes of the light shielding mask of one embodiment of the apparatus 500. A phase shift between the two and the remaining two of the diffractive laser beams is $\lambda/2$. In this embodiment, a phase shift between the interference light beams respectively produced by the diffractive laser beams 206 passing through the second hole 218 and the third hole 220 (FIG. 2) is zero. A phase shift between one interference light beam produced by the diffractive laser beams 206 passing through the second hole 218 and the third hole 220 (FIG. 2) and other interference light beam produced by the diffractive laser beams 206 passing through the fourth hole 222 and the fifth hole 224 is $\lambda/2$. In FIG. 5A, the 3D simulation result of the interference light beam produced by the four second collimated laser beams 206B emitted from the four of the symmetric holes of the light shielding mask 214 shows a plurality of cylindrical patterns. Also, a long axis direction of the plurality of cylindrical patterns is substantially parallel to the z-axis. FIG. 5B shows a simulation in the x-y plane (2D simulation) of the interference light beam produced by the four second collimated laser beams 206B emitted from the four of the symmetric holes of the light shielding mask 214. It is noted that embodiments as shown in FIGS. 5A and 5B are examples only. The desired number of the diffractive laser beams can be allowed to pass through the phase shift element to change the phase of the desire number of diffractive laser beams. Also, the diffractive laser beams with a phase shift and other diffractive laser beams without a phase shift can produce various interference light beam to fabricate various periodic micro-patterns on the surface of the element.

Figure 6A:
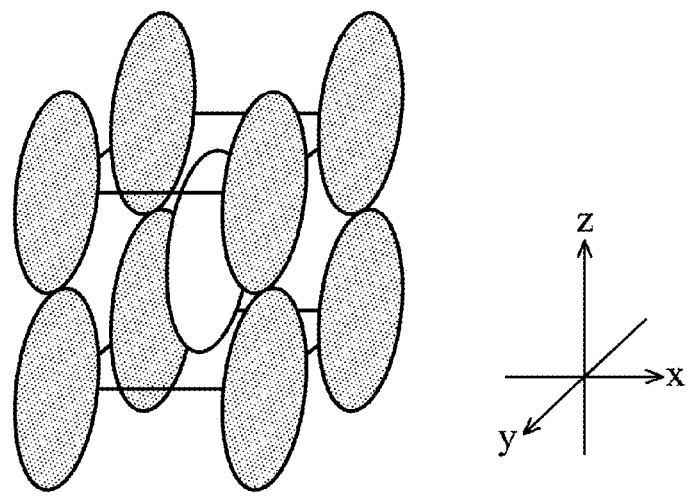
FIGS. 6A, 6B and 6C are two-dimensional (2D) and three-dimensional (3D) simulation results of an interference light beam pattern produced by the diffractive laser beams passing through five of the holes of the light shielding mask of one embodiment of an apparatus for fabricating a periodic micro-pattern by laser beam of the invention.
Figure 6B:
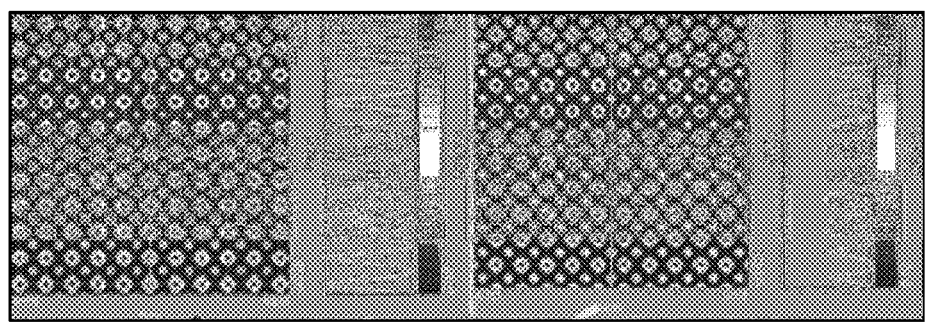
Figure 6C:
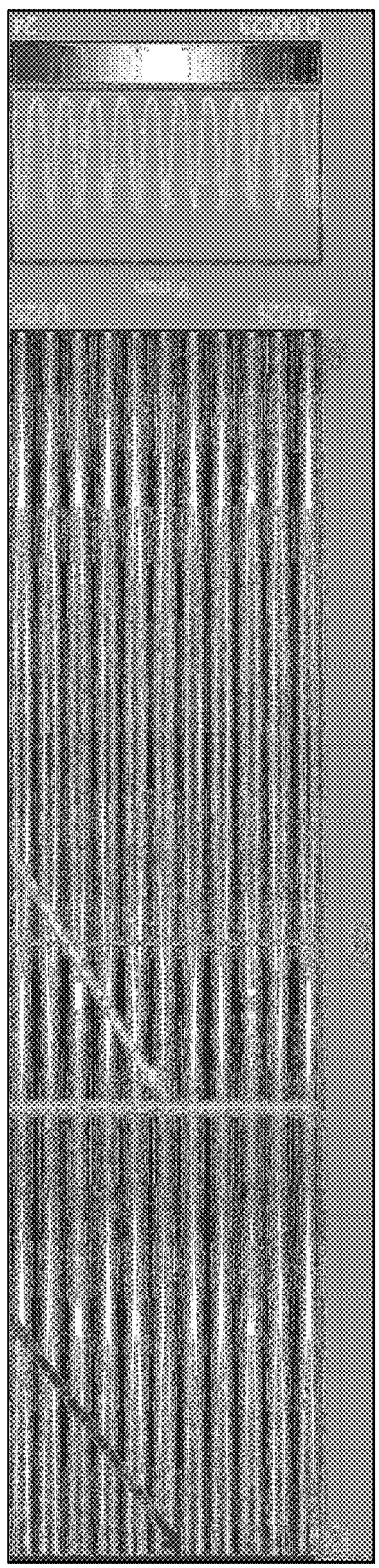

FIGS. 6A, 6B and 6C are two-dimensional (2D) (x-y plane and y-z plane) and three-dimensional (3D) simulation results of an interference light beam produced by the diffractive laser beams passing through five of the holes of the light shielding mask 214 of one embodiment of the apparatus 500 for fabricating a periodic micro-pattern by laser beam of the invention. Similar to FIGS. 2A, 2B and 2C, the x-axis and y-axis are parallel to the surface of the element 236, and the z-axis is perpendicular to the surface of the element 236 as shown in FIGS. 6A, 6B and 6C. As shown in FIGS. 1A, 1B, 6A, 6B and 6C, in one embodiment, the first collimated laser beams 206A are designed to pass through only five of the holes of the light shielding mask 214, to produce five second collimated laser beams 206B with the same phase. For example, a composition of only five of the holes of the light shielding mask 214 includes the first hole 216, the second hole 218, the third hole 220, the fourth hole 222 and the fifth hole 224 or the first hole 216, the sixth hole 226, the seventh hole 228, the eighth hole 230 and the ninth hole 232. FIG. 6A is a 3D simulation result of the interference light beam produced by the diffractive laser beams passing through five of the holes of the light shielding mask 214. From FIG. 6A, the 3D simulation result of the interference light beam produced by the five second collimated laser beams 206B emitted from the four of the symmetric holes of the light shielding mask 214 shows a unit pattern composed of five circular patterns arranged as a body-centered cubic (BCC) crystal structure. Therefore, the periodic micro-pattern in the 3D view is composed by repeating and periodically arranging the unit pattern. Also, a normal line direction of the circular patterns is substantially parallel to the x-axis. FIGS. 6B and 6C show simulation results in the x-y plane and y-z plane (2D simulation) of the interference light beam produced by the five second collimated laser beams 206B emitted from the five of the symmetric holes of the light shielding mask 214.

Figure 7:
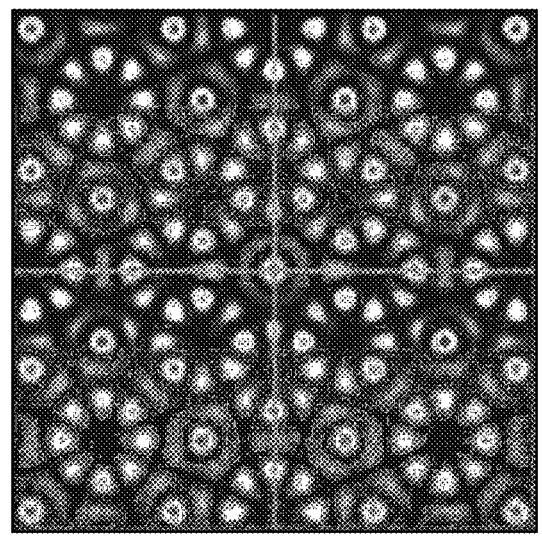
FIG. 7 is two-dimensional (2D) simulation result of an interference light beam pattern produced by the diffractive laser beams passing through eight of the holes of the light shielding mask of one embodiment of an apparatus for fabricating a periodic micro-pattern by laser beam of the invention.
Figure 8:
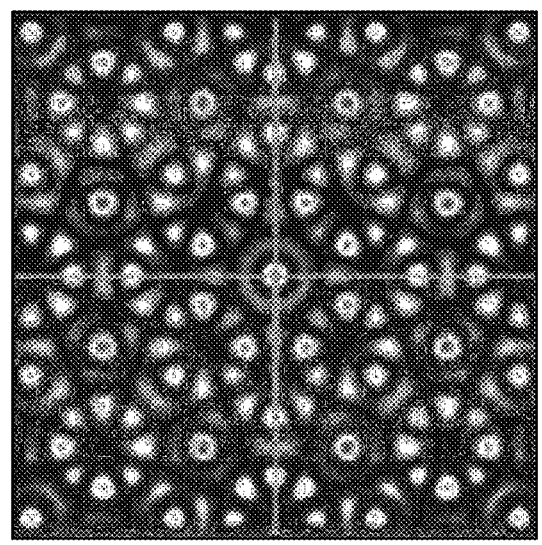
FIG. 8 is two-dimensional (2D) simulation result of an interference light beam produced by the diffractive laser beams passing through nine of the holes of the light shielding mask of one embodiment of an apparatus for fabricating a periodic micro-pattern by laser beam of the invention.

FIG. 7 is two-dimensional (2D) simulation (x-y plane) result of an interference light beam produced by the diffractive laser beams passing through eight of the holes of the light shielding mask 214 of one embodiment of the apparatus 500 for fabricating a periodic micro-pattern by laser beam of the invention. FIG. 8 is two-dimensional (2D) simulation (x-y plane) result of an interference light beam produced by the diffractive laser beams passing through nine (all) of the holes of the light shielding mask 214 of one embodiment of the apparatus 500 for fabricating a periodic micro-pattern by laser beam of the invention. Similar to FIGS. 2A, 2B and 2C, the x-axis and y-axis are parallel to the surface of the element 236, and the z-axis is perpendicular to the surface of the element 236 as shown in FIGS. 7, 6B and 8. As shown in FIGS. 1A, 1B and 7, in one embodiment, the first collimated laser beams 206A are designed to pass through only eight of the holes of the light shielding mask 214, to produce eight second collimated laser beams 206B with the same phase. For example, a composition of only eight of the holes of the light shielding mask 214 includes the second hole 218, the third hole 220, the fourth hole 222, the fifth hole 224, the sixth hole 226, the seventh hole 228, the eighth hole 230 and the ninth hole 232. From FIG. 7, the simulation in the x-y plane (2D simulation) of the interference light beam produced by the eight second collimated laser beams 206B emitted from the eight of the symmetric holes of the light shielding mask 214 shows a pattern with 90-degree rotational symmetry. From FIG. 8, the simulation in the x-y plane (2D simulation) of the interference light beam produced by the nine second collimated laser beams 206B emitted from the nine (all) of the symmetric holes of the light shielding mask 214 shows a pattern with 90-degree rotational symmetry.

Figure 9:
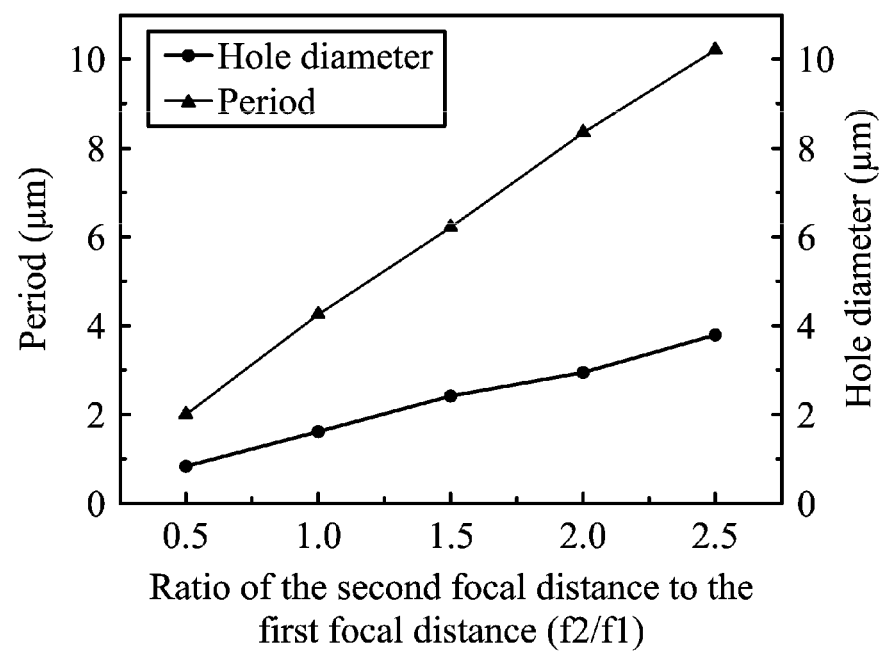
FIG. 9 is a diagram showing the relationship between a ratio of focal distances of two lenses of a confocal system of one embodiment of an apparatus for fabricating a periodic micro-pattern by laser beam of the invention and a hole diameter of a periodic micro-pattern, and showing a relationship between the ratio and a period of the periodic micro-pattern.

FIG. 9 is a diagram showing a relationship between a ratio (f2/f1) of focal distances of two lenses of a confocal system of one embodiment of an apparatus for fabricating a periodic micro-pattern by laser beam of the invention and a hole diameter of a periodic micro-pattern, and showing a relationship between the ratio and period of the periodic micro-pattern. In other embodiments, the ratio of a focal distance of the second lens 212 to a focal distance of the first lens 210 can be modified by changing the focal distance of the second lens 212 of the confocal system 208 as shown in FIG. 1A. The hole diameter and the period of the periodic micro-pattern can be further controlled by modifying the ratio. The hole diameter (d) is defined as a width or a diameter of a unit pattern of the periodic micro-pattern. The relationship between the hole diameter (d) and a wavelength ($\lambda$) of the interference light beam can be represented by a formula of $d=\lambda/4 \sin \theta$, wherein $\theta$ is an incident angle of the interference light beam. The period (p) of the periodic micro-pattern is defined as a pitch of bright fringes of the periodic micro-pattern (interference pattern). The relationship between the period (p) and the wavelength ($\lambda$) of the interference light beam can be represented by a formula of $p=\lambda/2 \sin \theta$, wherein $\theta$ is an incident angle of the interference light beam. Please refer to FIGS. 1A and 9, in one embodiment, the first lens 210 of the confocal system 208 has a first focal distance f1, and the second lens 212 has a second focal distance f2. When the ratio f2/f1 is changed to 0.5, the hole diameter (d) of the periodic micro-pattern is about 0.8 μm, and the period (p) of the periodic micro-pattern is about 2 μm. Please refer to FIGS. 1A and 9 again. When the ratio f2/f1 is changed to 1.0, the hole diameter (d) of the periodic micro-pattern is about 1.5 μm, and the period (p) of the periodic micro-pattern is about 4.2 μm. When the ratio f2/f1 is changed as 1.5, the hole diameter (d) of the periodic micro-pattern is about 2.2 μm, and the period (p) of the periodic micro-pattern is about 6.2 μm. When the ratio f2/f1 is changed as 2.0, the hole diameter (d) of the periodic micro-pattern is about 3 μm, and the period (p) of the periodic micro-pattern is about 8.4 μm. When the ratio f2/f1 is changed as 2.5, the hole diameter (d) of the periodic micro-pattern is about 3.8 μm, and the period (p) of the periodic micro-pattern is about 10.2 μm. From the forgoing, the rate of increase of the period (p) of the periodic micro-pattern is more than that of the hole diameter (d) of the periodic micro-pattern while increasing the ratio f2/f1. In one embodiment, the ratio of the second focal distance f2 of the second lens 212 to the first focal distance f1 of the first lens 210 can be controlled to between about 0.5 and 2.5.

Embodiments provide an apparatus and a method for fabricating a periodic micro-pattern by laser beam. The apparatus and the method for fabricating a periodic micro-pattern by laser beam uses an ablation process of multiple ultrafast laser light beams. The ablation process uses the ultrafast laser light beam with high power incident to the device to cause a nonlinear optical absorption effect and to ablate the surface of the element. Also, the ablation process further uses the interference of multiple ultrafast laser light beams to enhance the power density to directly ablate the surface of the element. The apparatus may control a number of diffractive laser beams by using the diffraction optical element (DOE), so that the desirable intensity of the interference light beam can be produced by the desired number of diffractive laser beams. Also, the apparatus may control the time of the surface during which the element is exposed to the interference light beam to control the etching velocity of the ablation process and the depth of the periodic micro-pattern. Additionally, the apparatus may control the incident angle of the interference light beam incident to the surface of the element or the number of diffractive laser beams which produce the interference light beam by modifying the position and number of holes of the light shielding mask. The controlled interference light beam would precisely fabricate the periodic micro-pattern with various patterns and shapes by ablating the surface of the element. Moreover, the apparatus may control the number and phase of the diffractive laser beams which produce the interference light beam by using the light blocking element and the phase shift element. The controlled interference light beam would ablate the surface of the element to precisely fabricate the periodic micro-pattern with various patterns and shapes. Also, the apparatus may control the hole diameter and the period of the periodic micro-pattern by modifying the ratio of the focal distance of the second lens to the focal distance of the first lens. The apparatus is easily constructed with lenses and optical elements. Also, the apparatus can directly ablate the surface of the element to precisely and quickly fabricate a periodic micro-pattern on the surface of the element without any exposure and development steps.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for fabricating a periodic micro-pattern by laser beam, comprising:

an ultrafast laser light source configured to generate an output laser beam;

a diffraction optical element configured to divide the output laser beam into a plurality of diffractive laser beams; and a confocal system configured to focus the plurality of diffractive laser beams on a focal point, so that the plurality of diffractive laser beams produces an interference light beam with interference phenomena, wherein the interference light beam ablates a surface of an element to fabricate a periodic micro-pattern on the surface of the element, wherein the confocal system comprises:

a first lens configured for the plurality of diffractive laser beams being incident thereto to produce a plurality of first collimated laser beams;

a light shielding mask having a plurality of holes, configured for the plurality of first collimated laser beams being incident thereto to produce a plurality of second collimated laser beams; and a second lens configured to focus the plurality of second collimated laser beams to a focal point of the second lens, wherein the first lens, the second lens and the light shielding mask are arranged along an optical axis of the output laser beam, and the light shielding mask is disposed between the first lens and the second lens, so that the plurality of diffractive laser beams passes through the first lens, the light shielding mask and the second lens in sequence.

2. The apparatus for fabricating a periodic micro-pattern by laser beam as claimed in claim 1, wherein the plurality of holes of the light shielding mask comprises:
a first hole arranged along an optical axis of the first lens and the second lens; and
a plurality of symmetric holes positioned on a circumference of a circle, wherein the first hole is positioned on a central point of the circle, wherein each of the plurality of symmetric holes is separated from the first hole by a distance that is the same as a radius of the circle, and wherein the plurality of symmetric holes are symmetric to an axis vertical through the first hole.

3. The apparatus for fabricating a periodic micro-pattern by laser beam as claimed in claim 2, wherein a plurality of symmetric holes comprises:
a second hole;
a third hole;
a fourth hole;
a fifth hole;
a sixth hole;
a seventh hole;
an eighth hole; and
a ninth hole, wherein a central angle whose vertex is the first hole and whose sides are radii intersecting the circle in any two adjacent holes of the second to ninth holes is 45 degrees.

4. The apparatus for fabricating a periodic micro-pattern by laser beam as claimed in claim 3, further comprising:
a light blocking element disposed on the light shielding mask, wherein the light blocking element is configured to block one of the first to ninth holes.

5. The apparatus for fabricating a periodic micro-pattern by laser beam as claimed in claim 1 further comprising:
a phase shift element disposed in the confocal system, wherein a phase of one of the plurality of diffractive laser beams that passes through the phase shift element is different from a phase of the rest of the plurality of diffractive laser beams without passing through the phase shift element.

6. The apparatus for fabricating a periodic micro-pattern by laser beam as claimed in claim 1, wherein the first lens and the second lens are convex lenses.

7. The apparatus for fabricating a periodic micro-pattern by laser beam as claimed in claim 1, wherein the first lens has a first focal distance, the second lens has a second focal distance, and wherein a ratio of the second focal distance to the first focal distance is between about 0.5 and 2.5.

8. The apparatus for fabricating a periodic micro-pattern by laser beam as claimed in claim 2, wherein an electric field formula of the interference light beam only passing through the first hole is $E \cos(kz - \omega t + \phi_H)$, wherein E is an electric field, k is a wave vector, z is a position vector, $\omega$ is an angular velocity, t is time, $\omega_H$ is a phase shift between one and the rest of the plurality of first collimated laser beams only passing through the first hole.

9. The apparatus for fabricating a periodic micro-pattern by laser beam as claimed in claim 3, wherein an electric field formula of the interference light beam only passing through the second hole is $E \cos(k \cos\theta_z z - k \sin\theta_y y - \omega t + \phi_A)$, wherein E is an electric field, k is a wave vector, y and z are position vectors, $\omega$ is an angular velocity, t is time, $\theta z$ and $\theta y$ are incident angles of the interference light beam incident to the surface of the element, $\phi_A$ is a phase shift between one and the rest of the plurality of first collimated laser beams only passing through the second hole.

10. The apparatus for fabricating a periodic micro-pattern by laser beam as claimed in claim 3, wherein an electric field formula of the interference light beam only passing through the third hole is $E \cos(k \cos\theta_z z + k \sin\theta_y y - \omega t + \phi_B)$, wherein E is an electric field, k is a wave vector, y and z are position vectors, $\omega$ is an angular velocity, t is time, $\theta z$ and $\theta y$ are incident angles of the interference light beam incident to the surface of the element, $\phi_B$ is a phase shift between one and the rest of the plurality of first collimated laser beams only passing through the third hole.

11. The apparatus for fabricating a periodic micro-pattern by laser beam as claimed in claim 3, wherein an electric field formula of the interference light beam only passing through the fourth hole is $E \cos(k \cos\theta_z z - k \sin\theta_x x - \omega t + \phi_C)$, wherein E is an electric field, k is a wave vector, x and z are position vectors, $\omega$ is an angular velocity, t is time, $\theta z$ and $\theta x$ are incident angles of the interference light beam incident to the surface of the element, $\phi_C$ is a phase shift between one and the rest of the plurality of first collimated laser beams only passing through the fourth hole.

12. The apparatus for fabricating a periodic micro-pattern by laser beam as claimed in claim 3, wherein an electric field formula of the interference light beam only passing through the fifth hole is $E \cos(k \cos\theta_z z + k \sin\theta_x x - \omega t + \phi_D)$, wherein E is an electric field, k is a wave vector, x and z are position vectors, $\omega$ is an angular velocity, t is time, $\theta z$ and $\theta x$ are incident angles of the interference light beam incident to the surface of the element, $\phi_D$ is a phase shift between one and the rest of the plurality of first collimated laser beams only passing through the fifth hole.

13. The apparatus for fabricating a periodic micro-pattern by laser beam as claimed in claim 3, wherein an electric field formula of the interference light beam only passing through the sixth hole is $E \cos(k \cos\theta_z z - k \sin\theta_{x1} x - k \sin\theta_{y1} y - \omega t + \phi_E)$, wherein E is an electric field, k is a wave vector, x, y and z are position vectors, $\omega$ is an angular velocity, t is time, $\theta z$ and $\theta x1$ and $\theta y1$ are incident angles of the interference light beam incident to the surface of the element, $\phi_E$ is a phase shift between one and the rest of the plurality of first collimated laser beams only passing through the sixth hole.

14. The apparatus for fabricating a periodic micro-pattern by laser beam as claimed in claim 3, wherein an electric field formula of the interference light beam only passing through the seventh hole is $E \cos(k \cos\theta_z z + k \sin\theta_{x1} x + k \sin\theta_{y1} y - \omega t + \phi_F)$, wherein E is an electric field, k is a wave vector, x, y and z are position vectors, $\omega$ is an angular velocity, t is time, $\theta z$ and $\theta x1$ and $\theta y1$ are incident angles of the interference light beam incident to the surface of the element, $\phi_F$ is a phase shift between one and the rest of the plurality of first collimated laser beams only passing through the seventh hole.

15. The apparatus for fabricating a periodic micro-pattern by laser beam as claimed in claim 3, wherein an electric field formula of the interference light beam only passing through the eighth hole is $E \cos(k \cos\theta_z z + k \sin\theta_{x1} x - k \sin\theta_{y1} y - \omega t + \phi_G)$, wherein E is an electric field, k is a wave vector, x, y and z are position vectors, $\omega$ is an angular velocity, t is time, $\theta z$ and $\theta x1$ and $\theta y1$ are incident angles of the interference light beam incident to the surface of the element, $\phi_G$ is a phase shift between one and the rest of the plurality of first collimated laser beams only passing through the eighth hole.

16. The apparatus for fabricating a periodic micro-pattern by laser beam as claimed in claim 3, wherein an electric field formula of the interference light beam only passing through the ninth hole is $E \cos(k \cos \theta_z z - k \sin \theta_{x1} x + k \sin \theta_{y1} y - \omega t + \phi_H)$, wherein E is an electric field, k is a wave vector, x, y and z are position vectors, ω is an angular velocity, t is time, θz and θx1 and θy1 are incident angles of the interference light beam incident to the surface of the element, $\phi_H$ is a phase shift between one and the rest of the plurality of first collimated laser beams only passing through the ninth hole.

17. A method for fabricating a periodic micro-pattern by laser beam, comprising:
generating an output laser beam by an ultrafast laser light source;
the output laser beam being incident to a diffraction optical element to be divided into a plurality of diffractive laser beams;
the plurality of diffractive laser beams being incident to a confocal system to be focused on a focal point, so that the plurality of diffractive laser beams produces an interference light beam with interference phenomena, wherein the confocal system comprises:
a first lens configured for the plurality of diffractive laser beams being incident thereto to produce a plurality of first collimated laser beams;
a light shielding mask having a plurality of holes, configured for the plurality of first collimated laser beams being incident thereto to produce a plurality of second collimated laser beams; and
a second lens configured to focus the plurality of second collimated laser beams to a focal point of the second lens,
wherein the first lens, the second lens and the light shielding mask are arranged along an optical axis of the output laser beam, and the light shielding mask is disposed between the first lens and the second lens, so that the plurality of diffractive laser beams passes through the first lens, the light shielding mask and the second lens in sequence,
disposing an element on the focal point of the second lens, so that the interference light beam ablates a surface of the element to fabricate a periodic micro-pattern on the surface of the element.

18. The method for fabricating a periodic micro-pattern by laser beam as claimed in claim 17, wherein the plurality of holes of the light shielding mask comprises:
a first hole arranged along an optical axis of the first lens and the second lens; and
a plurality of symmetric holes positioned on a circumference of a circle, wherein the first hole is positioned on a central point of the circle, wherein each of the plurality of symmetric holes is separated from the first hole by a distance that is the same as a radius of the circle, and wherein the plurality of symmetric holes are symmetric to an axis vertical through the first hole.

19. The method for fabricating a periodic micro-pattern by laser beam as claimed in claim 18, wherein a plurality of symmetric holes comprises:
a second hole;
a third hole;
a fourth hole;
a fifth hole;
a sixth hole;
a seventh hole;
an eighth hole; and
a ninth hole, wherein a central angle whose vertex is the first hole and whose sides are radii intersecting the circle in any two adjacent holes of the second to ninth holes is 45 degrees.

20. The method for fabricating a periodic micro-pattern by laser beam as claimed in claim 19, further comprising:
disposing a light blocking element on the light shielding mask to block one of the first to ninth holes.

21. The method for fabricating a periodic micro-pattern by laser beam as claimed in claim 17, further comprising:
disposing a phase shift element in the confocal system, wherein a phase of one of the plurality of diffractive laser beams that passes through the phase shift element is different from a phase of the rest of the plurality of diffractive laser beams without passing through the phase shift element.

22. The method for fabricating a periodic micro-pattern by laser beam as claimed in claim 17, wherein the first lens and the second lens are convex lenses.

23. The method for fabricating a periodic micro-pattern by laser beam as claimed in claim 17, further comprising:
choosing the second lens having a second focal distance, so that a ratio of the second focal distance to a first focal distance is between about 0.5 and 2.5.

24. The method for fabricating a periodic micro-pattern by laser beam as claimed in claim 18, wherein an electric field formula of the interference light beam only passing through the first hole is $E \cos(kz - \omega t + \phi_H)$, wherein E is an electric field, k is a wave vector, z is a position vector, ω is an angular velocity, t is time, $\phi_H$ is a phase shift between one and the rest of the plurality of first collimated laser beams only passing through the first hole.

25. The method for fabricating a periodic micro-pattern by laser beam as claimed in claim 19, wherein an electric field formula of the interference light beam only passing through the second hole is $E \cos(k \cos \theta_z z - k \sin \theta_y y - \omega t + \phi_A)$, wherein E is an electric field, k is a wave vector, y and z are position vectors, φ is an angular velocity, t is time, θz and θy are incident angles of the interference light beam incident to the surface of the element, $\phi_A$ is a phase shift between one and the rest of the plurality of first collimated laser beams only passing through the second hole.

26. The method for fabricating a periodic micro-pattern by laser beam as claimed in claim 19, wherein an electric field formula of the interference light beam only passing through the third hole is $E \cos(k \cos \theta_z z + k \sin \theta_y y - \omega t + \phi_B)$, wherein E is an electric field, k is a wave vector, y and z are position vectors, ω is an angular velocity, t is time, θz and θy are incident angles of the interference light beam incident to the surface of the element, $\phi_B$ is a phase shift between one and the rest of the plurality of first collimated laser beams only passing through the third hole.

27. The method for fabricating a periodic micro-pattern by laser beam as claimed in claim 19, wherein an electric field formula of the interference light beam only passing through the fourth hole is $E \cos(k \cos \theta_z z - k \sin \theta_x x - \omega t + \phi_C)$, wherein E is an electric field, k is a wave vector, x and z are position vectors, ω is an angular velocity, t is time, θz and θx are incident angles of the interference light beam incident to the surface of the element, $\phi_C$ is a phase shift between one and the rest of the plurality of diffractive laser beams only passing through the fourth hole.

28. The method for fabricating a periodic micro-pattern by laser beam as claimed in claim 19, wherein an electric field formula of the interference light beam only passing through the fifth hole is $E \cos(k \cos \theta_z z + k \sin \theta_x x - \omega t + \phi_D)$, wherein E is an electric field, k is a wave vector, x and z are position vectors, ω is an angular velocity, t is time, θz and θx are incident angles of the interference light beam incident to the surface of the element, $\phi_D$ is a phase shift between one and the rest of the plurality of first collimated laser beams only passing through the fifth hole.

29. The method for fabricating a periodic micro-pattern by laser beam as claimed in claim 19, wherein an electric field formula of the interference light beam only passing through the sixth hole is $E \cos(k \cos \theta_z z - k \sin \theta_{x1} x - k \sin \theta_{y1} y - \omega t + \phi_E)$, wherein E is an electric field, k is a wave vector, x, y and z are position vectors, ω is an angular velocity, t is time, θz and θx1 and θy1 are incident angles of the interference light beam incident to the surface of the element, $\phi_E$ is a phase shift between one and the rest of the plurality of first collimated laser beams only passing through the sixth hole.

30. The method for fabricating a periodic micro-pattern by laser beam as claimed in claim 19, wherein an electric field formula of the interference light beam only passing through the seventh hole is $E \cos(k \cos \theta_z z + k \sin \theta_{x1} x + k \sin \theta_{y1} y - \omega t + \phi_F)$, wherein E is an electric field, k is a wave vector, x, y and z are position vectors, ω is an angular velocity, t is time, θz and θx1 and θy1 are incident angles of the interference light beam incident to the surface of the element, $\phi_F$ is a phase shift between one and the rest of the plurality of first collimated laser beams only passing through the seventh hole.

31. The method for fabricating a periodic micro-pattern by laser beam as claimed in claim 19, wherein an electric field formula of the interference light beam only passing through the eighth hole is $E \cos(k \cos \theta_z z + k \sin \theta_{x1} x - k \sin \theta_{y1} y - \omega t + \phi_G)$, wherein E is an electric field, k is a wave vector, x, y and z are position vectors, ω is an angular velocity, t is time, θz and θx1 and θy1 are incident angles of the interference light beam incident to the surface of the element, $\phi_G$ is a phase shift between one and the rest of the plurality of first collimated laser beams only passing through the eighth hole.

32. The method for fabricating a periodic micro-pattern by laser beam as claimed in claim 19, wherein an electric field formula of the interference light beam only passing through the ninth hole is $E \cos(k \cos \theta_z z - k \sin \theta_{x1} x + k \sin \theta_{y1} y - \omega t + \phi_H)$, wherein E is an electric field, k is a wave vector, x, y and z are position vectors, ω is an angular velocity, t is time, θz and θx1 and θy1 are incident angles of the interference light beam incident to the surface of the element, $\phi_H$ is a phase shift between one and the rest of the plurality of first collimated laser beams only passing through the ninth hole.

* * * * *